March 27, 1962 HANS-WERNER PIEPLOW 3,027,431

MAGNETIC PICK-UP HEADS WITH REPLACEABLE POLE-PIECES

Filed Jan. 5, 1959

INVENTOR
HANS-WERNER PIEPLOW
BY Kemon, Palmer, Stewart & Estabrook
ATTORNEYS

United States Patent Office 3,027,431

Patented Mar. 27, 1962

3,027,431

MAGNETIC PICK-UP HEADS WITH REPLACEABLE POLE-PIECES

Hans-Werner Pieplow, Nurnberg, Germany, assignor to Max Grundig, Furth, Germany

Filed Jan. 5, 1959, Ser. No. 784,984
4 Claims. (Cl. 179—100.2)

This invention is concerned with improving the pick-up and reproduction quality of magnetic heads with replaceable pole-pieces.

Magnetic heads with replaceable pole tips have been proposed in which the pole tips are held in fixed position by fastening them on a support that is made of non-magnetizable metal. Magnetic heads of such type are used, for example, for magnetic-sound-apparatus operating with grooved sound carrying records. In the aforementioned heads the pole tips are connected by way of a very small gap formed of a narrow strip of non-magnetizable metal having a width of $7\mu$, for example, and the connected tips are soldered onto a brass plate which serves as a pole tip carrier or support. This carrier is pushed into the magnetic head assembly so that the base or root portions of the pole tips will lie against the pole pieces of the magnet core. In order to keep the magnetic resistance as small as possible, the pole-tip base or root portions are pressed against the pole pieces by a clamping screw.

It has been found, and this discovery forms part of the invention, that as a result of the contact between the brass plate carrier and the pole tips small eddy currents flow in the brass plate carrier which seriously impair the pick-up and reproducing quality of the magnetic heads in question. In order to correct this defect there is proposed an arrangement for improving the pick-up and reproducing quality of magnetic heads having replaceable pole tips which are held in fixed position on a carrier or support made of non-magnetizable metal.

The object of the invention is accomplished by designing the pole-tip assembly so that production of eddy currents in the pole-tip carrier in the region of the pole tips is suppressed or substantially reduced.

Figure 1:
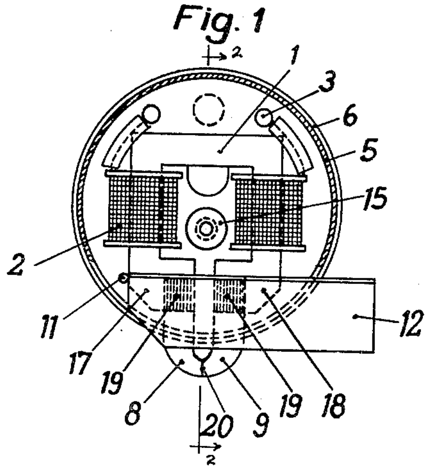
Figure 2:
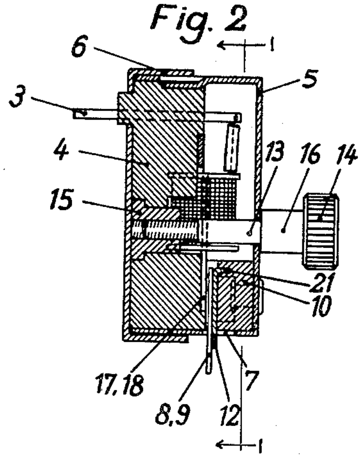

Below there is described in connection with FIGS. 1–4 of the drawing an embodiment of the invention, which serves as an example, and various modifications of the replaceable pole-tip assembly. Of these figures, FIG. 1 shows a view of the magnetic head with the upper shielding or screening cover member cut away along the plane 1—1 of FIG. 2; FIG. 2 shows a cross section through the magnetic head along the plane 2—2 of FIG. 1; FIG. 3 shows an inside view, and FIG. 3*a* a side view, of the upper shielding or screening cover and parts mounted in the bottom thereof; and FIGURES 4*a*, *b*, and *c* show a modification of the replaceable pole tip assembly.

The magnet core 1 is located together with winding 2 and the terminal pin 3 in a body 4 of hardened insulating material. The aforesaid parts are enclosed in a two-shell shielding or screening casing 5, 6 made of mu-metal so that it has the form of a container. The upper shielding-shell 5 has a broad slot 7 formed horizontally in the lower portion of the cylindrical wall thereof for the insertion of the replaceable pole-piece assembly carrying pole-tips 8, 9. Within the shielding shell 5 a guide element 10 made of non-magnetizable material, such as aluminum, is arranged at one side of the slot 7 which, together with a stop-pin 11 on base element 4, serves to guide and position the replaceable pole-piece assembly in which pole-tips 8 and 9 are mounted on the carrier plate 12 formed of non-magnetic material such as brass. Moreover a hole 13 is provided in the end wall of upper shielding-shell member 5 for the reception of a clamping screw 14 which can be screwed in the body 4 made of insulating material and into threaded engagement with an embedded female member 15. The pressure of the clamping screw 14, which is effective through the enlarged shouldered portion 16 of the adjusting screw acting on shell 5, moves the guide element 10 inwardly which also moves the brass plate carrier member 12 and presses pole tips 8 and 9 against the pole shoes 17 and 18 of magnet system 1. At this time the base or root portions of the replaceable pole tips 8 and 9 overlap or cover portions of pole pieces 17 and 18. Thus the base portions of the replaceable pole tips 8 and 9 cover the pole pieces 17 and 18 in the dotted-line areas 19 indicated in FIG. 1. The replacement of the pole tips 8 and 9 is accomplished after the clamping screw 14 is released. Thus by grasping the right hand end of carrier plate 12 projecting out of the screening housing 5 and 6 the old pole-tip pair assembly may be drawn out toward the right and replaced by a new pair assembly.

The embodiment of the replaceable pole-tip assembly as proposed in accordance with the invention is explained in connection with FIGS. 4*a*, *b* and *c*.

Figure 3A:
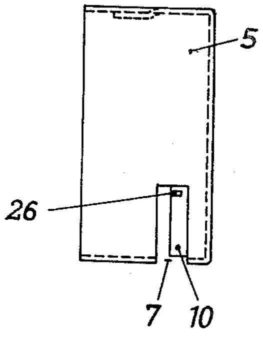
Figure 3:
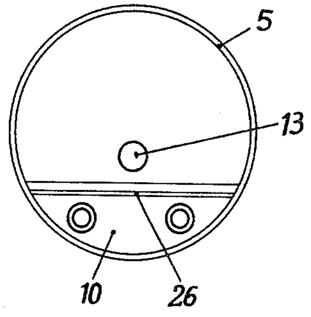
Figure 4A:
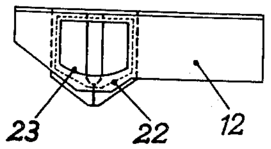
Figure 4B:
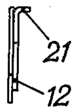
Figure 4C:
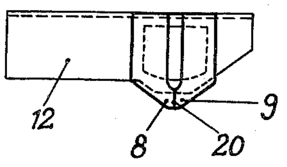

In the first embodiment shown in FIGS. 4*a* to 4*c* in front, side, and back views respectively, the two pole tips 8 and 9, separated by a gap 20 of non-magnetizable material, are soldered onto an elongated thin sheet 12 of non-magnetizable material, e.g. sheet brass, which for mechanical strength and guiding purposes has a flange 21 extending laterally from its upper edge and which upon pushing the replaceable pole-tip assembly into the magnetic head slides in the groove 26 of the guide member 10, see FIGS. 3*a* and 3*b*. It has been found that by reason of the contact between the root portions of the pole pieces 8 and 9 and the metallic carrier member 12 eddy currents can flow in the carrier member which cause a noticeable decrease in the pickup and reproducing quality of the magnetic heads in question. In order to suppress these eddy currents the pole tips 8 and 9 are connected to the metallic carrier member 12 in the outer marginal areas only, as by soldering along the dotted line path 22 in FIGURE 4*a*, while within this area the carrier sheet 12 is cut out to form the opening 23. In a further embodiment not shown the insulating layer between the metallic carrier member and the pole tips can be produced on the carrier member, for example by anodic treatment of an aluminum carrier plate before the pole tips are mounted thereon.

I claim:

1. In an electromagnetic head assembly having a magnetic core structure, replaceable pole tips therefor comprising a carrier member in the form of a plate of non-magnetic metallic material having an opening therein, a pair of spaced pole pieces of magnetizable material extending across the opening in the carrier member and overlying only a small marginal portion of the material of the carrier member about the opening, the pole pieces being metallically and rigidly bonded to the carrier member at the overlying portion thereof, and the major planes of said pole pieces and said carrier member being arranged in parallel relationship.

2. In an electromagnetic head assembly according to claim 1 in which one pair of corresponding ends of the pole pieces projects freely from the carrier member.

3. In an electromagnetic head assembly having a magnetic core structure, replaceable pole tips therefor comprising a carrier member in the form of a plate of non-magnetic metallic material having an opening therein, a pair of spaced pole pieces of magnetizable material extending across the opening in the carrier member and overlying only a small marginal portion of the material of the carrier member about the opening, the pole pieces being soldered to the carrier member at the overlying portion thereof.

4. In an electromagnetic head assembly according to claim 3 in which one pair of corresponding ends of the pole pieces projects freely from the carrier member, and the major planes of said pole pieces and said carrier member being arranged in parallel relationship.

References Cited in the file of this patent

UNITED STATES PATENTS

| | | |
|---|---|---|
| 2,761,910 | Sher | Sept. 4, 1956 |
| 2,761,911 | Camras | Sept. 4, 1956 |

FOREIGN PATENTS

| | | |
|---|---|---|
| 1,055,860 | France | Oct. 21, 1953 |
| 737,323 | Great Britain | Sept. 21, 1955 |
| 1,121,583 | France | May 7, 1956 |